Nov. 22, 1955
A. J. ROBERTSON
2,724,611
LOAD CARRYING VEHICLE BODY
Filed May 11, 1953
3 Sheets-Sheet 1
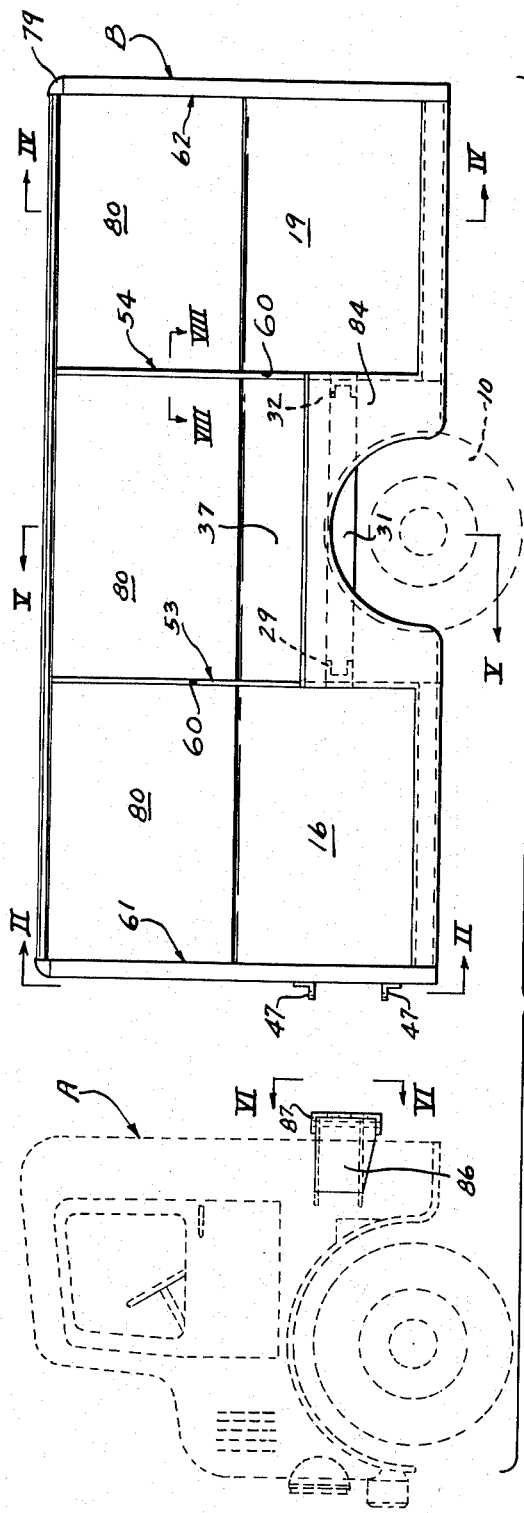
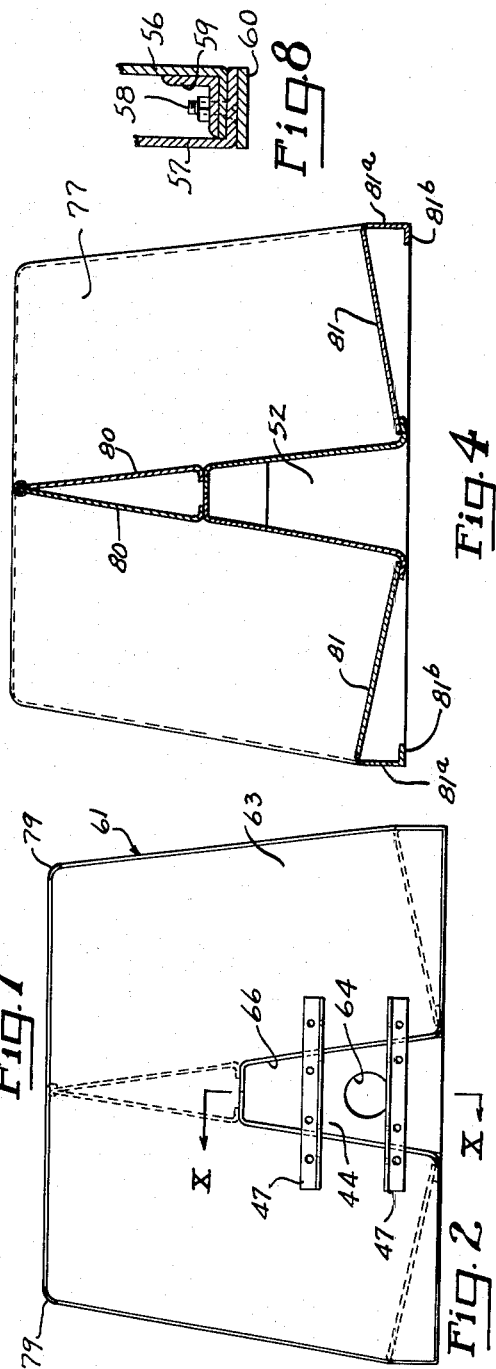
INVENTOR.
ARTHUR J. ROBERTSON
BY
Jennings & Carter
ATTORNEYS Nov. 22, 1955
A. J. ROBERTSON
2,724,611
LOAD CARRYING VEHICLE BODY
Filed May 11, 1953
3 Sheets-Sheet 2
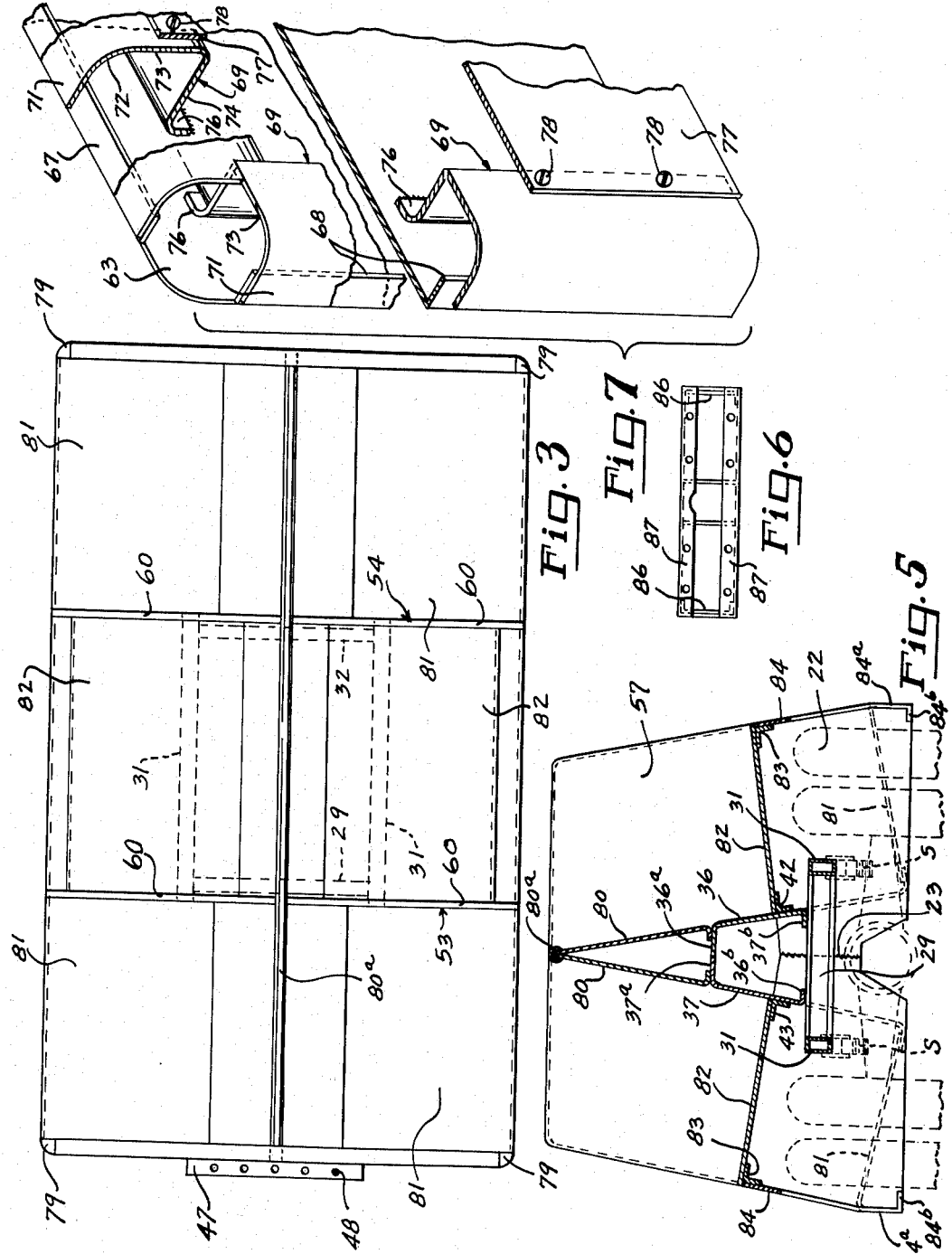
INVENTOR.
ARTHUR J. ROBERTSON
BY
*Jennings & Carter*
ATTORNEYS

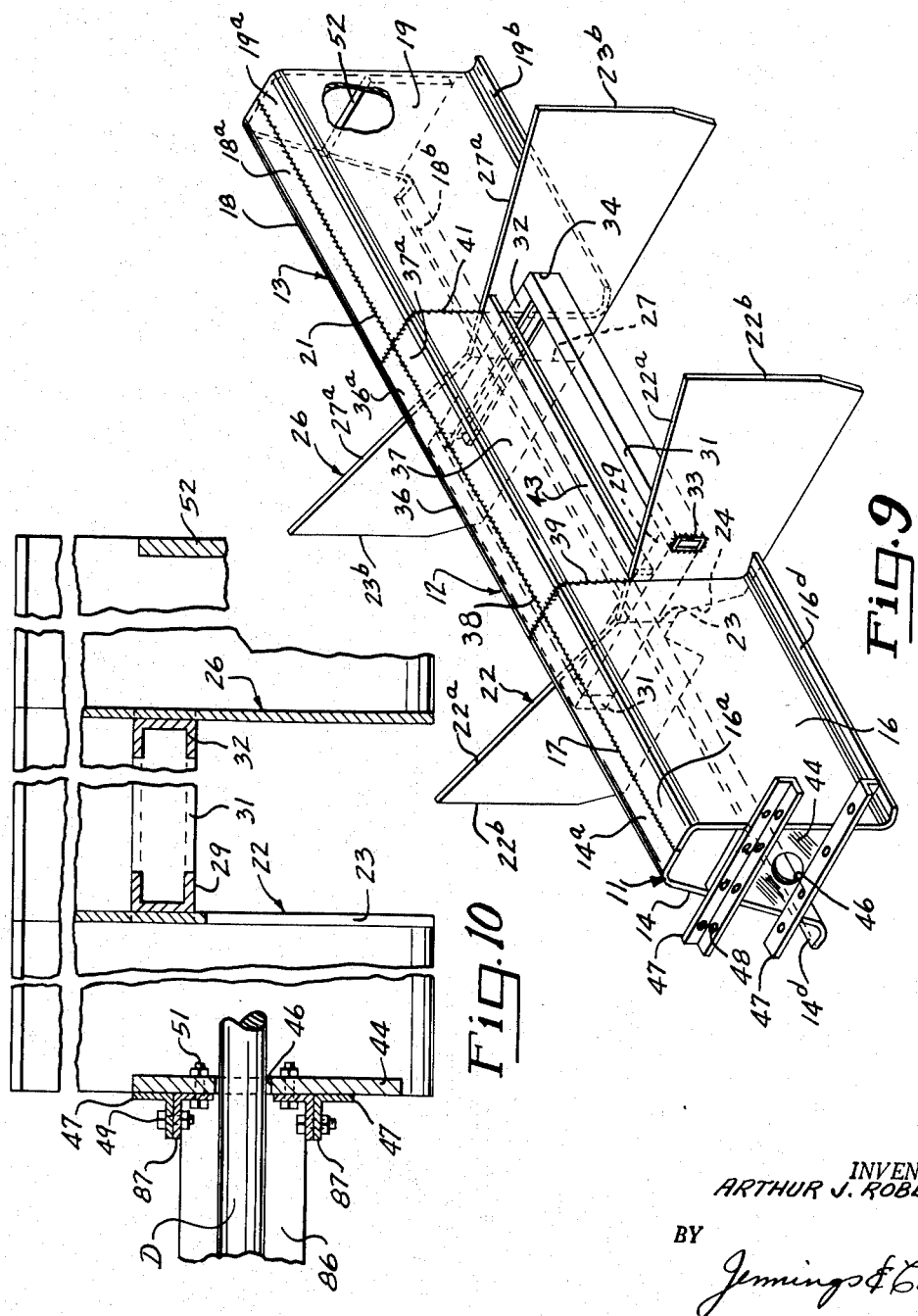

United States Patent Office 2,724,611
Patented Nov. 22, 1955

2,724,611
LOAD CARRYING VEHICLE BODY

Arthur J. Robertson, Birmingham, Ala., assignor to Highway Trailers and Utilities of Alabama, Inc., a corporation of Alabama Application May 11, 1953, Serial No. 353,987

9 Claims. (Cl. 296—28)

My present invention relates to vehicles and more particularly to a vehicle having a body in which certain of the load supporting and cargo carrying parts also serve as the frame for the vehicle.

My invention relates more particularly to vehicle bodies of the type having open load carrying compartments along each side, which bodies are customarily employed in the delivery of cased goods such as bottled soft drinks and the like.

In the art to which this invention relates vehicle bodies for carrying cases of goods usually have been mounted on standard motor trucks embodying the customary wide chassis frame. Such construction results in cargo bays or spaces which are very narrow transversely of the vehicle since it is desirable that the cargo carrying bays extend fore and aft of the rear vehicle wheels and below the top of the rear wheels. In some prior construction the motor truck frame is pinched inwardly fore and aft of the rear wheels. Such construction permits the fore and aft cargo compartments to extend below the top of the wheels. However, the expense and complications relative to the pinched frame itself and relative to mounting the body on such frame detracts from its practical usefulness. Further, the use of the frame and the required braces, body brackets, and other body attaching means results in a vehicle having considerable weight for a given load carrying capacity.

In view of the foregoing it is an object to my invention to provide a motor truck for carrying cased soft drinks and the like in which substantially all the rear or body portion of the chassis frame is eliminated, the requisite strength being built into the body itself.

Another object is to provide a side loading body of the character designated in which the overall width of the body may be less than in previous bodies of like cargo capacity, and which is lighter, stronger and less expensive than previous bodies.

Another object is to provide a motor vehicle in which the front thereof including the engine, transmission, front end and driver's cab are bolted to the cargo carrying portion of the body so that in event of damage either to the front or cargo section of the vehicle, the same may be unbolted and another section joined thereto with minimum effort and in minimum time.

A further object is to provide a motor vehicle in which the load carrying frame of the rear cargo carrying body is of inverted U-shape as viewed in transverse section, preferably fabricated of plates properly secured together, and running the length of the cargo carrying body, together with means to mount the rear springs to the frame, thus suspending the rear wheels from the body in such way that the weight of the body and cargo are transmitted effectively to the wheels through the springs.

A vehicle illustrating the features of my invention is shown in the accompanying drawings forming a part of this application in which:

Fig. 1 is a side elevational view with portions of the front of the vehicle in dotted lines and with the rear wheels of the vehicle also dotted;

Fig. 2 is a front elevational view of the rear section of the vehicle as viewed along line II—II of Fig. 1 with the same disconnected from the front part of the vehicle;

Fig. 3 is a plan view of the rear section of the vehicle;

Fig. 4 is a detail sectional view through the rear cargo carrying bay taken generally along line IV—IV of Fig. 1;

Fig. 5 is a detail sectional view through the intermediate cargo bay taken generally along line V—V of Fig. 1;

Fig. 6 is an end elevational view of the coupling connection taken along line VI—VI of Fig. 1;

Fig. 7 is a fragmental partly sectional isometric view of the front upper corner construction of the front end wall of the cargo carrying portion of the body as viewed from the inside of the body;

Fig. 8 is an enlarged detail sectional view taken generally along line VIII—VIII of Fig. 1;

Fig. 9 is a somewhat diagrammatic isometric view of the main load carrying plate framework of the rear body portion, certain of the parts being omitted for the sake of clarity; and, Fig. 10 is an enlarged, fragmental sectional view taken generally along line X—X of Fig. 2 and showing the two portions of the vehicle bolted together and with the drive shaft extending rearwardly from the transmission of the vehicle.

Referring now to the drawings for a better understanding of my invention, it will be seen that my improved vehicle comprises two main sections A and B. Section A of the vehicle or the front end, includes the motor, the transmission, the front wheels, steering apparatus and the driver's cab. The cargo carrying section, or rear, B comprises the cargo carrying body proper and the rear wheels indicated in dotted lines at 10. For the purpose of constructing my improved vehicle, I may start with a standard motor truck and as will later appear I may cut out the central part of the frame between the cab and the wheels 10, leaving only a small part of the same above the springs.

As best shown in Fig. 9 of the drawing, the frame of the load carrying section B of my improved vehicle comprises a front section 11, an intermediate section 12 and a rear section 13. The front section 11 is formed of plates 14 and 16 each of which is somewhat L-shaped as viewed in transverse section. The plates 14 and 16 have flat upper sections or flanges 14a and 16a respectively which are welded together along the line 17. The plates flare outwardly and turned substantially at 90 degrees from the bottom edge of each are flanges 14d and 16d, respectively.

Welded to the inner edges of the plates 14 and 16 of the frame section 11 is a vertical cross plate 22. The upper edges 22a of the cross plate 22, on either side of the frame, slope inwardly and intersect the sloping sides of the plates 14 and 16 at substantially 90 degrees. The outer edges 22b of the plate 22 slope downwardly at substantially 90 degrees to the upper edges 22a. For convenience, the plate 22 may be made of identical halves and may be welded together along the vertical meeting center line 23. Also, the plate may be provided with a downwardly opening cut-out 24 to pass the drive shaft D which leads to the differential of the rear axle in the manner well understood.

The frame section 13 carries a plate 26, substantially identical with plate 22, which is welded to the vertical inner edges of the plates 18 and 19. The plate 26 may be formed in halves as already mentioned and welded together along the line 27. The plate 26 has upwardly sloping top surfaces 27a, in horizontal alignment and identical in configuration with plate 22. In similar manner, the outer edges 23b are at 90 degrees with the upwardly sloping top edges 27a.

Welded to the inner surface of plate 22 is a length of channel 29 disposed transversely across the face of the plate. Welded to the ends of the channel 29 is a longitudinally disposed short section of frame 31, one on each side of the vehicle as indicated in Fig. 5. In similar manner, a length of channel 32 is secured to the inside of plate 26 to which the rear ends of the frame channels 31 are welded. Channels 31 project through holes 33 and 34 in the plates 22 and 26, respectively, and the ends of the channel 31 are welded in the holes of the plates.

The intermediate frame portion 12 comprises plates 36 and 37 having flat surfaces 36a and 37a, respectively, welded together along the line 38. The plates 36 and 37 may be provided with inturned flanges 36b and 37b, respectively, which are disposed to rest on the cross-channels 29 and 32 and may be welded thereto. Also, the sections 11 and 13 are welded to the section 12 along the lines 39 and 41.

Welded to the plates 36 and 37 are angles 42 and 43 which add strength to the assembly and which also serve to support a portion of the load carrying deck in the manner later to appear.

In the front end of the section 11 is a plate 44, welded between the plates 14 and 16. Plate 44 is provided with a hole 46 to pass the drive shaft D.

Welded to the plate 44 and to the ends of the plates 14 and 16 are spaced angles 47. The angles 47 are provided with holes 48 to pass bolts 49 and 51 for securing the front half of the vehicle to the body portion.

At the rear of section 13 is a rear brace plate 52 suitably welded between the plates 18 and 19.

By reference to Figs. 1 to 4 of the drawings it will be seen that the body comprises vertical partition walls 53 between the front and intermediate sections and vertical partition walls 54 between the intermediate and rear sections. These walls may comprise outer plates 56 and inner plates 57. The plates may be flanged over as indicated in Fig. 8 and may be secured by bolts 58 to an angle 59. The partition walls 53 and 54 are suitably cut out to fit about the frame portions as indicated in the several figures. The sheets 56 and 57 of the intermediate partition walls may be welded along the bottom edges to the tops of the cross-plates 22 and 26. A trim strip 60 may be provided if desired.

By reference to Fig. 7 it will be seen that the front and rear walls 61 and 62, respectively, comprise outer plates 63. Since the front and rear walls are substantially identical a description of one will suffice for both. The plate of the front wall may be provided with an opening 64 in line with the opening 46 to pass the drive shaft of the vehicle. Likewise, the plate 63 may be cut out as indicated at 66 to fit flush with the outer surface of the frame plates of the front frame section 11, and to lie just rearwardly of the angles 47.

The plate 63 has an inturned horizontal flange 67 along the upper edge and inturned flanges 68 along the vertical sides thereof. Welded to the flange 67, and similarly to the flanges 68, is the flange 71 of a peripheral reinforcing member 69. The member 69 also has a curved portion 72 and an inturned portion 73 which carries a portion 74 turned directly toward the plate 63. The portion 74 terminates in a flange 76 which is welded to the inner surface of the plate 63. Covering the inside of the structure just described is a plate 77 which may be secured to the members 69 by any suitable means such as metal screws 78. The resulting open, upper corners may be closed by a quadrispherical member 79. The wall construction just described results in a strong, light-weight wall, the plates of which may readily be welded to the body frame construction previously described.

The sections 11 and 13 may be provided with load carrying plates 81 which rest at their inner edges on the out-turned flanges 14d—16d, 18b—19b, respectively.

The inner edges of the deck or load carrying plates 81 may be welded to the flanges. Further, the plates may be provided with outwardly disposed, vertical sections 81a and inturned flanges 81b. Further, the plates are of a length to fit snugly against the respective plates 22 and inner plates 77 of the front wall and rear wall so that the plates 81 may be welded to the plates just mentioned to form a strong, unitary structure. In very similar manner the intermediate section 12 is provided with load carrying plates 82 which rest at their inner edges on the angles 42 and 43 and may be welded thereto. At their outer edges the plates may rest on and be secured to angles 83 welded between the plates 22 and 26. The last mentioned angles are omitted from Fig. 9 for the sake of clarity.

To further strengthen the body and enhance the ornamental appearance thereof I may provide wheel cover plates 84 which have vertical sections 84a adjacent their lower ends and inturned flanges 84b which lie in the plane of the portions 81a and 81b of the lower load carrying deck plates 81. Relatively light gauge sheet metal plates 80 may be placed on the base of the U-shaped frame to complete the center partition. A round pipe-like member 80a may form a cap for the plates 80.

By reference to Figs. 6 and 10 it will be seen that the projecting portions of the frame 86 extending rearwardly from the front part A of the vehicle may be provided with angles 87 having holes therein for receiving the bolts 49 and 51. It will be apparent therefore that with the bolts in place the two halves of the vehicle are securely and rigidly bolted in vertical and horizontal planes.

In connection with the frame section 31 over the rear wheels 10 it will be apparent that the springs indicated at S in dotted lines in Fig. 5 may be carried by the members 31 in somewhat conventional manner. Thus, all the load of the body supported by the rear wheels is adequately transmitted through the springs S, frame members 31, and thence into the built-up, main backbone frame consisting of the sections 11, 12 and 13 and the vertical plates 22 and 26.

From the foregoing it will be apparent that I have devised an improved vehicle having a body thereon especially adapted for hauling cased goods such as soft drinks and the like. It will be noted that the upwardly and outwardly sloping deck plates are at substantially 90 degrees to the plates 36—37, 14—16 and 18—19. The cases of goods therefore have no tendency to slide off the truck laterally and may be safely transported without binding them to the vehicle.

In actual practice I have found that if the main frame plate members indicated in Fig. 9 are made of approximately 10 gauge steel the strength thereof will be sufficient for all practical purposes. The remaining sheet work may be on the order of 14 to 22 gauge and as a whole this results in a body which is extremely strong and yet which is of minimum weight. In the event of accident or damage to either the front section A or the rear section B of the vehicle, by removing the bolts 49 and 51 and by disconnecting the drive shaft a new front or rear section may be quickly and easily installed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a vehicle, a load carrying body having a longitudinally extending centrally disposed frame of plates and forming the principal load carrying structure of the body, said frame being generally of inverted U-shape as viewed in transverse section and extending substantially the length of the body, supporting wheels intermediate the ends of the body substantially within the vertical confines thereof, outwardly extending load carrying decks rigidly secured to the sides of the U-shaped frame, the decks forwardly and rearwardly of the wheels being located below the tops of said wheels and the other decks being located over said wheels, and means supporting the outer portions of the decks.

2. A vehicle as defined in claim 1 in which the U-shaped frame has outstanding flanges thereon adjacent the lower edges thereof to which the inner edges of said decks are rigidly secured.

3. In a vehicle, a body having a metal plate frame generally of inverted U-shaped as viewed in transverse section and substantially the length of the body, said frame comprising the principal longitudinally disposed load carrying member in the body, the sides of said U-shaped frame sloping outwardly and downwardly of the top thereof, outstanding flanges near the lower ends of said sides subtending therewith an angle of substantially 90 degrees, outwardly extending load carrying decks joined adjacent their inner edges to said flanges and including with the frame sides angles of approximately 90 degrees, a set of supporting wheels, and means operatively connecting the body frame to said wheels.

4. In a combined chassis and body frame for vehicles, plates secured together and forming an inverted U-shaped elongated load carrying frame, transverse load carrying plates secured to the U-shaped frame intermediate the ends thereof and extending outwardly on either side of the U-shaped frame and dividing the U-shaped frame into front, intermediate and rear sections, the upper edges of said transverse plates lying above the lower edges of the front and rear portions of the U-shaped frame, outwardly extending load carrying decks secured to said front and rear portions of the U-shaped frame below the upper edges of said transverse plates, other outwardly extending load carrying decks secured to the intermediate portion of said U-shaped frame substantially at the level of the tops of said transverse plates, and running gear operatively connected to the plates of the intermediate section and to the transverse plates.

5. A vehicle frame as defined in claim 4 in which the intermediate portion of the U-shaped frame has outturned flange members on each side thereof on which rest the inner edges of the decks for the intermediate portion, said just named decks resting on the tops of said transverse plates, and means rigidly connecting the decks to the associated flange members and to the tops of the transverse plates.

6. In a vehicle, a combined load carrying vehicle chassis and body frame comprising a pair of substantially vertically disposed plates spaced laterally from each other and extending longitudinally of the vehicle substantially the length of the body, means connecting said plates rigidly together and thereby providing a load and draft sustaining beam disposed on either side of the longitudinal center line of the vehicle, a pair of load carrying vertically disposed transverse frame plates secured to the longitudinal plates and projecting outwardly on opposite sides thereof to define between them spaces to receive supporting wheels, running gear embodying supporting wheels, means operatively connecting the transverse plates to the running gear at points laterally outward of the longitudinal plates, whereby the weight of the combined chassis and body is transmitted to the running gear at least in part through the transverse plates, and load carrying decks secured to and projecting outwardly of the longitudinal plates.

7. In a vehicle, a combined chassis and body frame comprising a pair of plates spaced laterally apart and extending longitudinally of the vehicle, cross members securing the longitudinal plates together adjacent the ends thereof and along the length thereof and thereby providing a centrally disposed load and draft sustaining chassis and body frame having continuous plate members on either side of the center line of the vehicle, a pair of transverse load carrying plates secured to the longitudinal plates intermediate the ends thereof and spaced apart to define between them wheel wells at either side of the frame for receiving supporting wheels, running gear embodying supporting wheels, means operatively connecting the transverse plates to the running gear at points laterally outward of the longitudinal plates, whereby the weight of the combined chassis and body is transmitted to the running gear at least in part through the transverse plates, and load carrying decks secured to and projecting outwardly of the longitudinal plates.

8. A structure as defined in claim 7 in which the transverse plates extend continuously across the longitudinal plates and are of less depth than the longitudinal plates at the places where the same cross each other, and means rigidly connecting the transverse plates to the longitudinal plates.

9. In a vehicle, a combined chassis frame and load carrying body frame for the vehicle comprising a pair of spaced apart generally vertically disposed plates extending longitudinally of the vehicle for the entire length of the vehicle, inturned flanges along the upper edges of said plates joined rigidly together, a pair of spaced apart transverse plates extending across the longitudinal plates and projecting past the sides thereof to define between them wells for receiving supporting wheels, means rigidly connecting the transverse and longitudinal plates and thereby forming a unitary load and draft sustaining frame, running gear embodying supporting wheels, means connecting the running gear to the transverse plates and to the longitudinal plates whereby a part of the weight of the vehicle and its load is transmitted to said running gear through the longitudinal and transverse plates, and load carrying decks extending outwardly of the longitudinal plates forward of, aft of and between the transverse plates.

References Cited in the file of this patent

UNITED STATES PATENTS

| | | |
|---|---|---|
| D. 157,442 | Schwartzman | Feb. 21, 1950 |
| 1,261,603 | Palmer | Apr. 2, 1918 |
| 1,803,866 | Patterson | May 5, 1931 |
| 1,855,642 | Masury | Apr. 26, 1932 |
| 2,007,134 | Rosenberg | July 2, 1935 |
| 2,061,673 | Robinson | Nov. 24, 1936 |
| 2,157,075 | Grade | May 2, 1939 |
| 2,340,628 | Theriault | Feb. 1, 1944 |
| 2,455,429 | Lucien | Dec. 7, 1948 |
| 2,596,478 | Gerhardt | May 13, 1952 |
| 2,650,856 | Mashburn, Jr., et al. | Sept. 1, 1953 |

FOREIGN PATENTS

| | | |
|---|---|---|
| 491,383 | Great Britain | Sept. 1, 1938 |
| 776,309 | France | Oct. 31, 1934 |

OTHER REFERENCES

"Bottlers' Body," in "Commercial Car Journal," vol. LXXX, Issue 4, of December 1950; pgs. 62, 63, and 114.